(12) United States Patent
Li (10) Patent No.: US 10,655,940 B2
(45) Date of Patent: May 19, 2020

(54) BALLISTIC RESISTANT SHEET AND USE OF SUCH A SHEET

(71) Applicant: DSM IP ASSETS B.V., Heerlen (NL)

(72) Inventor: Zhi-Yi Li, Singapore (SG)

(73) Assignee: DSM IP ASSETS B.V., Heerlen (NL)

( * ) Notice: Subject to any disclaimer, the term of this patent is extended or adjusted under 35 U.S.C. 154(b) by 0 days.

(21) Appl. No.: 15/548,896

(22) PCT Filed: Feb. 5, 2016

(86) PCT No.: PCT/EP2016/052530
§ 371 (c)(1),
(2) Date: Aug. 4, 2017

(87) PCT Pub. No.: WO2016/124751
PCT Pub. Date: Aug. 11, 2016

(65) Prior Publication Data
US 2018/0017359 A1    Jan. 18, 2018

(30) Foreign Application Priority Data

Feb. 6, 2015  (SG) .......................... 10201500949V
Apr. 7, 2015  (EP) .................................. 15162583

(51) Int. Cl.
*F41H 5/04*     (2006.01)
*B32B 5/12*     (2006.01)
(Continued)

(52) U.S. Cl.
CPC ............ *F41H 5/0485* (2013.01); *B32B 5/12* (2013.01); *B32B 25/08* (2013.01); *B32B 25/14* (2013.01);
(Continued)

(58) Field of Classification Search
CPC ....... F41H 5/0485; F41H 5/0478; B32B 5/12; B32B 25/08; B32B 25/14; B32B 2260/021; B32B 2260/048; B32B 2262/0253
(Continued)

(56) References Cited

U.S. PATENT DOCUMENTS 4,623,574 A * 11/1986 Harpell .................... B32B 5/28
                                                       428/113
4,989,266 A *  2/1991 Borgese ................ F41H 5/0485
                                                         2/167
(Continued)

FOREIGN PATENT DOCUMENTS

WO   WO 2005/066577   7/2005
WO   WO 2008/077605   7/2008
WO   WO 2012/150169  11/2012

OTHER PUBLICATIONS

International Search Report for PCT/EP2016/052530, dated Apr. 29, 2016, 3 pages.

*Primary Examiner* — Joshua E Freeman
*Assistant Examiner* — Bridget A Cochran
(74) *Attorney, Agent, or Firm* — Nixon & Vanderhye P.C.

(57) ABSTRACT

The invention relates to a ballistic resistant sheet (12) comprising a three-layer hybrid structure, with a core layer (12-1) and two face layers (12-2; 12-3) wherein the core layer comprises at least one first monolayer comprised of first unidirectionally (UD) oriented fibers and a matrix material, and wherein each of the face layers comprise at least one second and at least one third monolayer comprised of second UD oriented fibers and third UD oriented fibers respectively and wherein the stiffness of the face layers is higher than the stiffness of the core layer.

15 Claims, 5 Drawing Sheets

(51) Int. Cl.
*B32B 25/08* (2006.01)
*B32B 25/14* (2006.01)

(52) U.S. Cl.
CPC ...... *F41H 5/0478* (2013.01); *B32B 2260/021* (2013.01); *B32B 2260/048* (2013.01); *B32B 2262/0253* (2013.01); *B32B 2307/54* (2013.01); *B32B 2571/02* (2013.01)

(58) Field of Classification Search
USPC ........................................................ 89/36.02
See application file for complete search history.

(56) References Cited

U.S. PATENT DOCUMENTS

| | | | | |
|---|---|---|---|---|
| 5,047,281 | A * | 9/1991 | Betz | B29B 15/08 428/198 |
| 5,108,678 | A * | 4/1992 | Hirasaka | B29C 70/12 156/296 |
| 5,229,199 | A * | 7/1993 | Miner | C08J 5/06 428/375 |
| 5,766,725 | A * | 6/1998 | Hogenboom | B29C 66/723 428/113 |
| 6,673,452 | B1 * | 1/2004 | Frenzel | B29C 70/54 428/413 |
| 7,527,854 | B2 * | 5/2009 | Jacobs | B29C 70/202 156/307.1 |
| 8,573,125 | B1 * | 11/2013 | Rossow | F42D 5/05 102/303 |
| 9,857,148 | B2 * | 1/2018 | Wilenski | B32B 5/14 |
| 2006/0002669 | A1 * | 1/2006 | Chiasson | G02B 6/4404 385/114 |
| 2007/0163023 | A1 * | 7/2007 | Steeman | B32B 5/02 2/2.5 |
| 2008/0241537 | A1 * | 10/2008 | Sennett | B29C 70/10 428/394 |
| 2009/0297816 | A1 * | 12/2009 | Arvidson | B32B 27/32 428/221 |
| 2010/0003452 | A1 * | 1/2010 | Jongedijk | B29C 43/003 428/107 |
| 2010/0064404 | A1 * | 3/2010 | Es Van | F41H 5/0485 2/2.5 |
| 2011/0203450 | A1 * | 8/2011 | Carbajal | B32B 5/26 89/36.02 |
| 2012/0156452 | A1 * | 6/2012 | Wilenski | B32B 5/14 428/212 |
| 2013/0061739 | A1 * | 3/2013 | Cheong | F41H 5/007 89/36.02 |
| 2013/0219600 | A1 * | 8/2013 | Atorrasagasti | F41H 1/02 2/463 |
| 2015/0033429 | A1 * | 2/2015 | Andrusyszyn | F41H 5/0457 2/2.5 |
| 2015/0082976 | A1 * | 3/2015 | Meldner | F41H 1/02 89/36.02 |
| 2016/0018193 | A1 * | 1/2016 | De Haas | F41H 5/0478 428/196 |
| 2016/0116257 | A1 * | 4/2016 | Kim | F41H 5/0485 89/36.02 |
| 2016/0209179 | A1 * | 7/2016 | Abdulghaffar | F41H 5/0485 |

* cited by examiner

BALLISTIC RESISTANT SHEET AND USE OF SUCH A SHEET

CROSS-REFERENCE TO RELATED APPLICATIONS

This application is the U.S. national phase of International Application No. PCT/EP2016/052530 filed 5 Feb. 2016, which designated the U.S. and claims priority to SG Patent Application No. 10201500949V filed 6 Feb. 2015, and EP Patent Application No. 15162583.7 filed 7 Apr. 2015, the entire contents of each of which are hereby incorporated by reference.

FIELD

The disclosed embodiments herein relate to ballistic resistant sheets, articles comprising such sheets and methods of making the same. In the art the ballistic resistant sheets according to the invention often are referred to as hybrid ballistic resistant sheets. The embodiments are especially adapted to facilitate the manufacture of ballistic resistant articles, preferably soft ballistic articles (e.g. ballistic resistant vest and the like). In preferred forms, the ballistic resistant sheets are a multi-monolayer construction including a core layer formed of at least one, preferably at least two, first monolayer comprised of first unidirectionally oriented reinforcing fibers and optionally an matrix material, which core layer is sandwiched between respective face layers, each face layer formed of at least one, preferably at least two, second monolayer comprised of second unidirectionally oriented reinforcing fibers and optionally a matrix material.

BACKGROUND AND SUMMARY

Ballistic resistant sheets comprising multiple monolayers containing unidirectionally (UD) oriented reinforcing fibers with a matrix material are known, e.g., from U.S. Pat. Nos. 4,623,574, 5,766,725 and 7,527,854 and U.S. Patent Application Publication No. 2010/0064404 (the entire contents of each being expressly incorporated hereinto by reference).

A ballistic resistant sheet is furthermore known from WO2012/150169. In this publication a two-layer hybrid structure is disclosed comprised of a first layer ('first stack') comprising laminates with a first kind of yarn, and of a second layer ('second stack') comprising laminates with a second kind of yarn. The first kind of yarn and the second kin of yarn differ in linear density or thickness. Some matrix materials are mentioned at page 3, including elastomer and epoxy resin. The examples disclose different types of aramid fibers and styrene-isoprene-styrene block copolymer as matrix material. There is no mention of a 3 layer fiber based hybrid structure.

A ballistic resistant sheet is known from WO2008/077605. This publication discloses the manufacture of ballistic resistant sheets, whereby the ballistic resistant sheet is built up from monolayers with unidirectional polyethylene fibers and a matrix material. The matrix material disclosed in the example is a styrene-isoprene-styrene block copolymer. Furthermore a ballistic resistant molded article is disclosed based on compressed ballistic resistant sheets combined with a ceramic strike face, optionally with a metal layer between the ceramic strike face and the ballistic resistant sheet. Again there is no mention of a 3 layer fiber based hybrid structure.

A ballistic resistant sheet and a composite article is furthermore known from US2012/0156452. In this publication composite structures are disclosed having a plurality of fibers which are at least partially embedded with a matrix. The fibers may be adhered to the matrix at a (varying) level of adhesion. The adhesion level between the fibers and the matrix may be varied spatially within the composite article, e.g. along the length of one of the fibers, or among the fibers in a given layer, or the adhesion may vary between layers of the composite article with the intention to increase the energy absorption of the composite article, i.e. improving bullet stopping ability of the composite article.

A ballistic resistant sheet is also known from WO2005/066577. In this publication sheets are disclosed comprising monolayers of unidirectionally oriented fibers with a strength of at least 1.2 GPa and a modulus of at least 40 GPa and a binder, and a porous separating film at the outer surfaces of the ballistic resistant sheet.

There is continuous drive towards improved ballistic resistant articles, including soft ballistic articles and moulded articles. Such improvements may include articles with improved drapeability. Improved drapeability means an improved wearing comfort of a vest, while at the same time the ballistic protection is not significantly reduced. Alternatively it can relate to about constant wearing comfort while the ballistic protection is improved. Preferably the ballistic protection is further improved. Such ballistic protection may relate to the bullet stopping characteristics, often referred to as V50—where 50% of the bullets are stopped—which may also be expressed as ballistic energy absorption, or V0 where all bullets are stopped by the ballistic resistant article, or reduction of trauma or backface deformation. The ballistic resistant sheets offer protection against e.g. bullets and ballistic fragments.

It is towards providing such ballistic resistant sheets and soft ballistic articles therefrom that the present invention is specifically directed.

In general, the embodiments disclosed herein relate to hybrid ballistic resistant sheets, articles which comprise such sheets and methods of making the same. According to some embodiments, the ballistic resistant sheets will include a core layer and face layers. The core layer may include at least one, preferably at least two, first monolayer comprised of first unidirectionally (UD) oriented fibers and a matrix material, while the face layers and may include at least one, preferably at least two, second, respectively third, monolayers comprised of second, respectively third UD oriented fibers, herein also referred to as UD fibers, and a matrix material.

Generally, the ballistic resistant sheet of the invention includes at least one core layer and outer layers, herein referred to as face layers, numbered therewith forming a 3 layer hybrid structure of 'face layer/core layer/face layer'. One of these outer layers, or face layers, will typically face the threat or impact, in the art referred to as strike face, while the other outer layer will be most remote from the threat. Such layer is in the art often referred to as back face. The core layer and face layers may be built up from monolayers or from pre-assembled sets of monolayers, herein referred to as sub-sheets. Each of the outer layers or face layers may be identical or have a different structure and/or composition.

DETAILED DESCRIPTION

Figure 1:
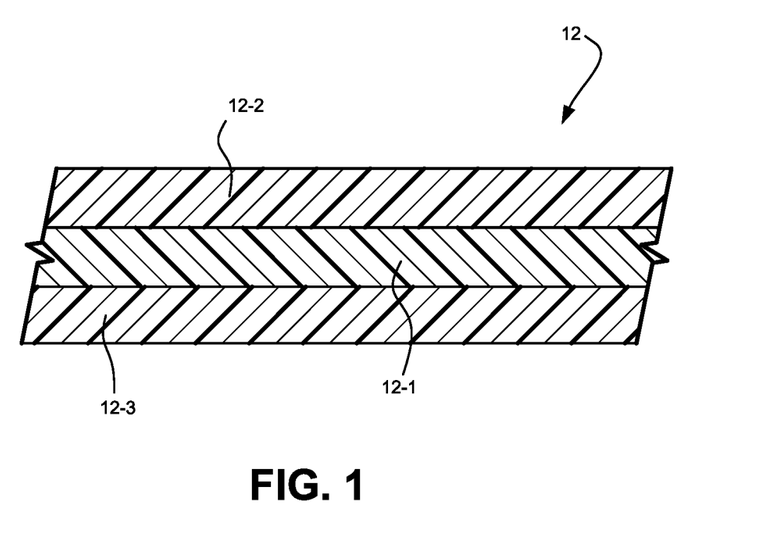
FIG. 1 is a schematic cross-sectional view of an embodiment of a hybrid ballistic resistant sheets of the invention schematically showing a face layer 12-2 located close to the ballistic threat (strike face), a core layer 12-1, and a face layer 12-3 located farthest from the ballistic threat (back face)
Figure 2:
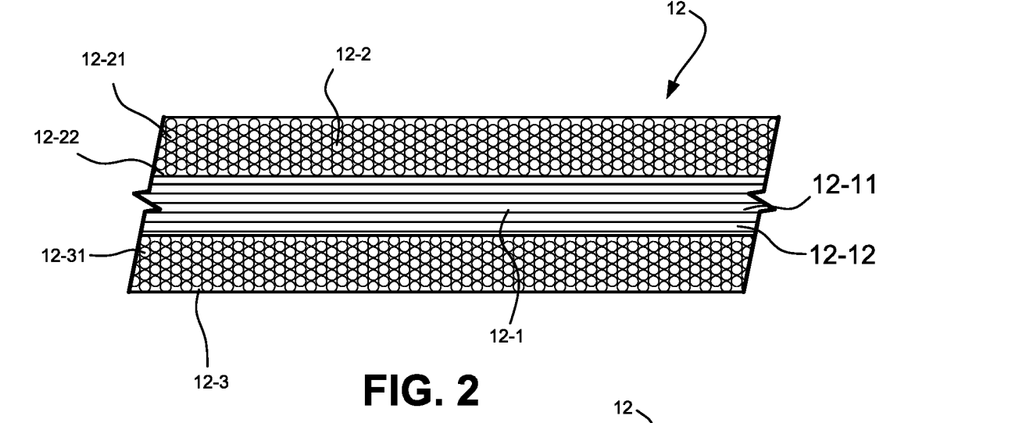
FIG. 2 is a schematic cross-sectional view of an embodiment of the hybrid ballistic resistant sheet similar to FIG. 1 having fiber and matrix material depicted by reference numerals 12-11 and 12-12, 12-21 and 12-22 and 12-31 and 12-32, in the core layer 12-1, the face layer 12-2 and the face layer 12-3, respectively.

An embodiment of the invention depicted in FIG. 1 relates to a ballistic resistant sheet (12) comprising a three-layer hybrid structure, said three-layer hybrid structure comprising a core layer (12-1) and two face layers (12-2; 12-3). As schematically depicted in FIG. 2, the core layer (12-1) comprises at least one, preferably at least 2, first monolayer comprised of first unidirectionally (UD) oriented fibers (12-11) and a matrix material (12-12), and wherein each of the face layers (12-2; 12-3) comprise at least one, preferably at least 2, second and at least one, preferably at least 2, third monolayer comprised of second UD oriented fibers (12-21) and third UD oriented fibers (12-31) and a matrix material (12-22, 12-32), respectively, wherein the flexibility of the face layers (12-2, 12-3) is higher than the flexibility of the core layer (12-1).

An embodiment of the invention relates to a ballistic resistant sheet (12) comprising a three-layer hybrid structure, said three-layer hybrid structure comprising a core layer (12-1) and two face layers (12-2; 12-3) wherein the core layer comprises at least one, preferably at least 2, first monolayer comprised of first unidirectionally (UD) oriented fibers and a matrix material, and wherein each of the face layers (12-2; 12-3) comprise at least one, preferably at least 2, second and at least one, preferably at least 2, third monolayer comprised of second UD oriented fibers and third UD oriented fibers respectively and wherein the flexibility, i.e. a numerical Flexibility Value, of the core layer 12-1 is between 0.5 and 9 N/kg/m$^2$ and wherein the numerical Flexibility Value of the face layers is higher than the numerical Flexibility Value of the core layer. In an even more preferred embodiment the numerical Flexibility Value of the core layer 12-1 is between 1 and 6 N/kg/m$^2$. In an even further preferred embodiment the numerical Flexibility Value of the core layer (12-1) is between 2 and 4 N/kg/m$^2$.

Preferably, each monolayer in the core layer, a face layer, or the ballistic resistant sheet contains the UD oriented reinforcing fibers with the fiber direction in each monolayer being rotated with respect to the fiber direction in an adjacent monolayer. Monolayers may be preassembled before their use in the ballistic resistant sheet according to the invention. For that purpose a set of 2, 4, 6, 8 or 10 monolayers may be stacked such that the fiber direction in each monolayer is rotated with respect to the fiber direction in an adjacent monolayer, followed by consolidation. Consolidation may be done by the use of pressure and temperature to form a preassembled sheet, or sub-sheet. Pressure for consolidation generally ranges from 1-100 bar while temperature during consolidation typically is between 60 and 140° C. Generally the manufacture of monolayers and sub-sheets as such are known to the skilled person. Such sub-sheets, in the art often referred to as 'UD-sheets', may be commercially available through e.g. DSM Dyneema.

Figure 3:
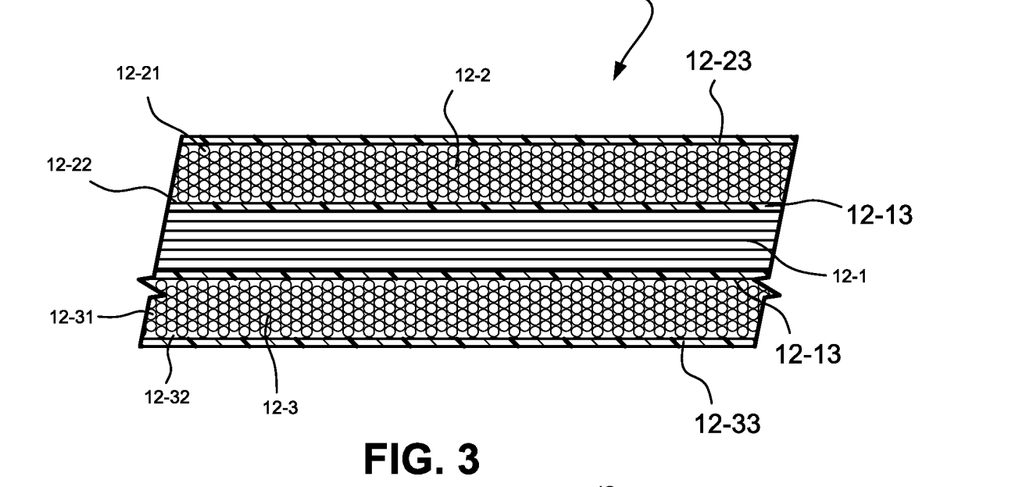
FIG. 3 is a schematic cross-sectional view of an embodiment of the hybrid ballistic resistant sheet similar to FIG. 2 having polymer film layers 12-13 between the core layer 12-1 and each of the face layers 12-2 and 12-3, in addition to polymer film layers 12-23 and 12-33 on the exposed surfaces of the face layers 12-2 and 12-3, respectively.

As shown schematically in FIG. 3, the at least one, preferably at least 2, monolayers in core or face layer, or sub-sheets may furthermore comprise a so-called separating film or cover sheet (12-3, 12-23, 12-33), being a polymeric film with a thickness of preferably between 1 and 20 micrometer, more preferably between 2 and 10 micrometer. The separating film may comprise polyethylene, especially ultrahigh molecular weight polyethylene, polypropylene, thermoplastic polyester or polycarbonate. Most preferably, biaxially-oriented films made from polyethylene, polypropylene, polyethylene terephthalate or polycarbonate are used as separating films. The biaxially orientation may be obtained by biaxially stretching. Preferably the separating film is at least 4×biaxially-stretched, most preferably a 10 to 100×biaxially-stretched, or biaxially-oriented, film. A 10 to 100×biaxially-oriented film is herein understood to be a film, which is stretched in two perpendicular directions such that the surface of the film increased by a factor 10 to 100. An advantage of biaxially-stretched films is that an even higher protection level at a certain weight can be obtained.

The weight, or areal density, of the monolayer including the weight of the fibers and matrix material is typically at least 25 g/m$^2$, sometimes between 30 and 300 g/m$^2$, such as between 30 and 280 g/m$^2$. According to some embodiments, the weight or areal density of the monolayer is between 40 and 150 g/m$^2$.

The drapeable ballistic resistant sheet of the invention is very suitable for use in soft ballistic articles, such as bullet-resistant vests.

Figure 5:
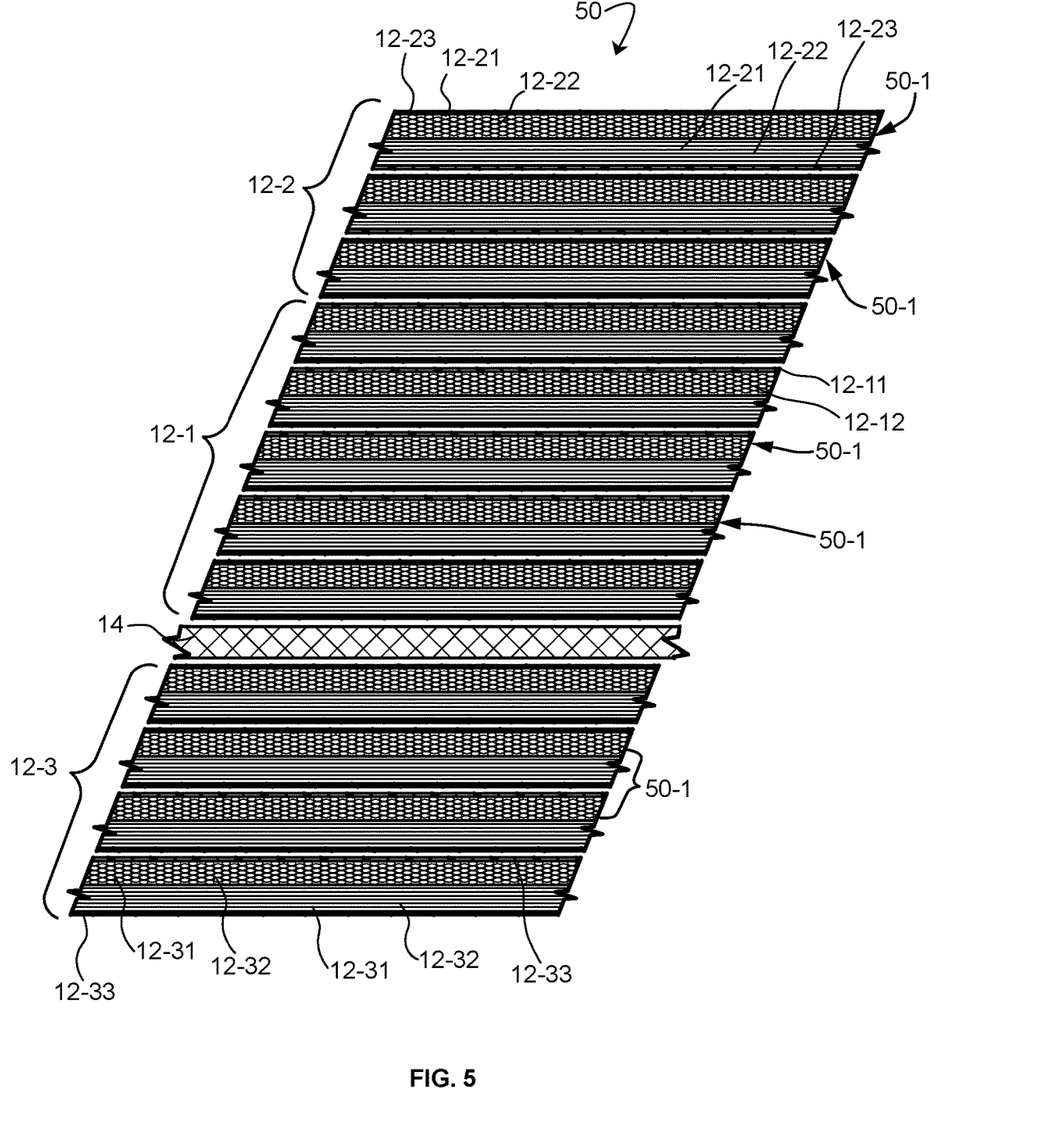
FIG. 5 is a schematic cross-sectional view of an embodiment of a drapeable hybrid ballistic resistant sheet comprised of an unconsolidated stack of sub-sheets forming the face layers and a core layer, with a trauma liner being interposed between the core layer and one of the face layers (e.g., the back-face layer)

One embodiment of a drapeable ballistic resistant sheet (50) is shown in FIG. 5 as being comprised of multiple sub-sheets (a representative few of which are identified by numeral 50-1) which form an unconsolidated stack establishing the core layer (12-1) and face layers (12-2, 12-3). Each of the sub-sheets (50-1) can be, for example, consolidated monolayers of fiber (12-11, 12-21) and matrix material (12-21, 12-22), respectively (only a representative few being identified in FIG. 5 for clarity of presentation) with polymer film layers (12-13, 12-23, 12-33) on the exposed faces as previously described.

Figure 6:
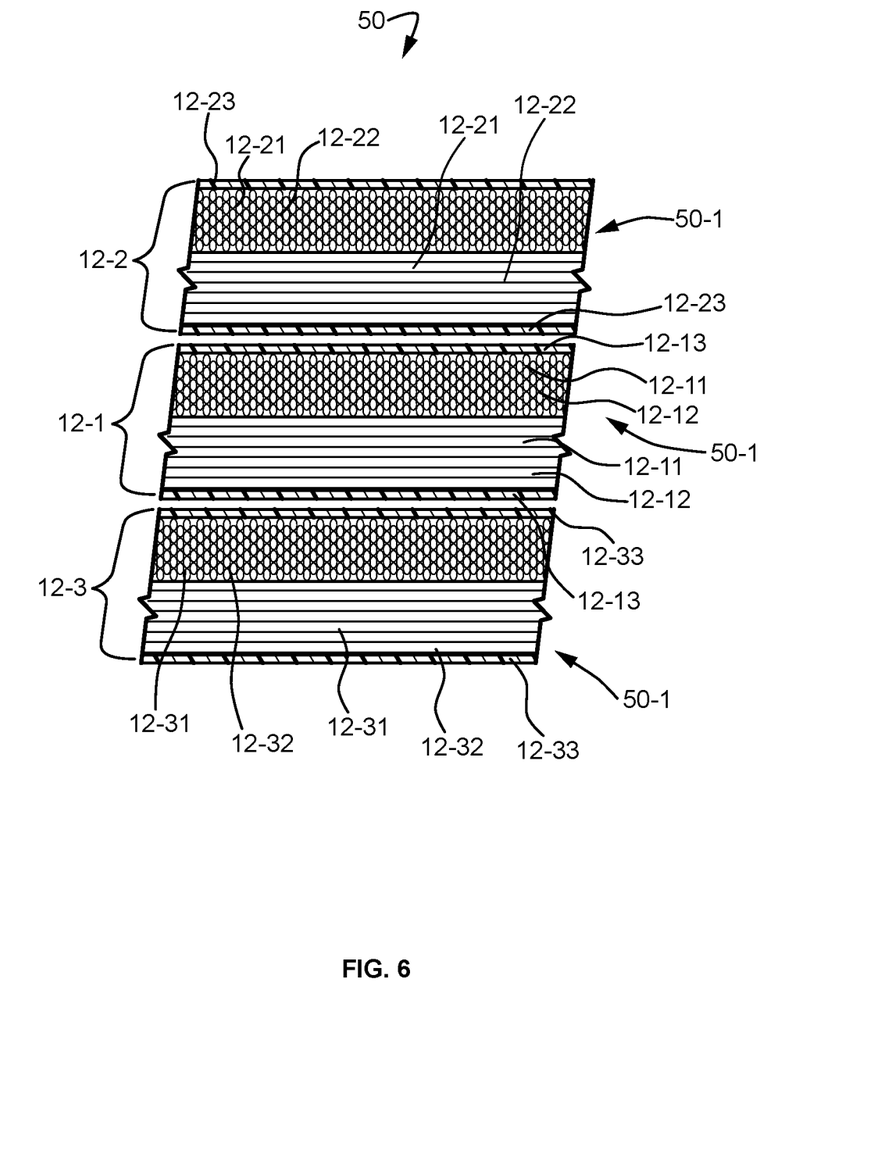
FIG. 6 is a schematic cross-sectional view of another embodiment of a drapeable hybrid ballistic resistant sheet comprised of an unconsolidated stack of sub-sheets forming the face layers and the core layer whereby a single consolidated sub-sheet forms each of such layers.

FIG. 6 shows an embodiment of a drapeable ballistic resistant sheet (50) similar to FIG. 5, but only comprised of an unconsolidated stack of single sub-sheets 50-1. Similar to the embodiment of FIG. 4, the embodiment depicted in FIG.

Figure 7:
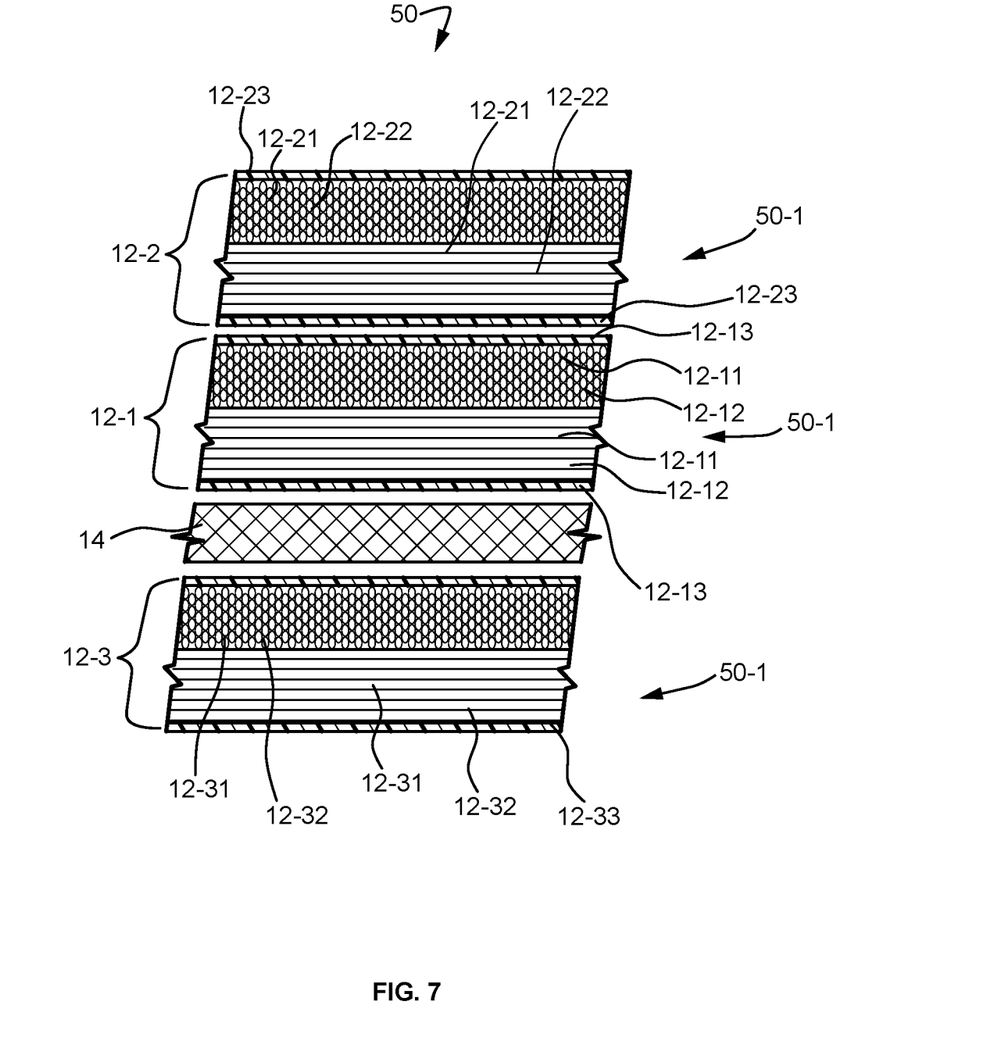
FIG. 7 is a schematic cross-sectional view of another embodiment of a drapeable hybrid ballistic resistant sheet similar to the embodiment depicted in FIG. 6 but including a trauma liner interposed between the core layer and one of the face layers (e.g., the back face layer).

7 may include a trauma layer (14) interposed between one of the face layers (12-3) and the core layer (12-1).

An alternative use of the ballistic resistant sheet of the invention is in compressed or moulded ballistic resistant articles such as panels and especially curved panels and articles (e.g., inserts, helmets, radomes).

The first, second and third UD fibers may be the same or different from one another and may be selected from inorganic fibers and more preferably from organic fibers. For example, at least one of the first, second and third UD fibers may be formed of inorganic fibers selected from the group consisting of glass fibers, carbon fibers and ceramic fibers. Alternatively or additionally, at least one of the first, second and third UD fibers may be formed of organic fibers selected from the group consisting of aromatic polyamide fibers, liquid crystalline polymer and ladder-like polymer fibers polyolefin fibers, polyvinyl alcohol fibers, and polyacrylonitriles fibers. According to some embodiments, at least one of the first, second and third UD fibers are formed of ultrahigh molecular weight (UHMW) polyethylene fibers, polybenzimidazole fibers, poly(1,4-phenylene-2,6-benzobisoxazole fibers and/or poly(2,6-diimidazo[4,5-b-4',5'-e] pyridinylene-1,4-(2,5-dihydroxy)phenylene) fibers. In a particularly preferred embodiment at least one of the first, second or third UD fibers are formed of ultrahigh molecular weight (UHMW) polyethylene fibers. In an even more preferred embodiment the first, second and third UD fibers are formed of ultrahigh molecular weight (UHMW) polyethylene fibers. Preferably the UHMW polyethylene fibers are made from ultrahigh molecular weight polyethylene with an Intrinsic Viscosity of at least 4 dl/g, preferably of at least 6 dl/g, more preferably of at least 8 dl/g. The Intrinsic Viscosity is determined according to ASTM D1601 at 135° C. in decalin, the dissolution time being 16 hours, with DBPC as anti-oxidant in an amount of 2 g/l solution, by extrapolating the viscosity as measured at different concentrations to zero concentration.

The fibers in the ballistic resistant sheet of the invention will preferably have a tensile strength of at least 1.5 GPa, more preferably at least 2.0 GPa, even more preferably at least 2.5 GPa and even more preferably at least 3.0 GPa. The maximum tensile strength may be up to about 6.0 GPa. Generally the tensile strength will be less than 7.0 GPa. Some embodiments will employ fibers having a tensile strength of between about 3.5 and about 4.5 GPa. Other embodiments will employ fibers having a tensile strength of between about 4.0 and about 4.9 GPa. According to some embodiments, the fibers will exhibit a tensile strength of between 3.6 and 4.3 GPa, more preferably between 3.7 and 4.1 GPa or most preferably between 3.75 and 4.0 GPa. This tensile strength is determined (at 25° C.) on multifilament yarns as specified in ASTM D885M, using a nominal gauge length of the fiber of 500 mm, and a crosshead speed of 50%/min.

In a preferred embodiment, the fibers in the strike face have a tensile strength that is at least 5%, or 1.05 times, higher than the tensile strength of the fibers in the core layer. More preferably the fibers in the strike face have a tensile strength that is at least 10% higher than the tensile strength of the fibers in the core layer. Even more preferably the fibers in the strike face have a tensile strength that is at least 15% higher than the tensile strength of the fibers in the core layer. Generally the fibers in the strike face have a tensile strength that is less than 180% of the tensile strength of the fibers in the core layer. Preferably the fibers in the strike face have a tensile strength that is less than 150% of the tensile strength of the fibers in the core layer. The core and face layers may optionally comprise a matrix material.

The term matrix material refers to a material that binds or holds the fibers together and may enclose the fibers in their entirety or in part, such that the structure of the monolayer is retained during handling and e.g. making of preformed sheets, sub-sheets or ballistic resistant sheets. The matrix materials of the core and face layers may comprise at most 20 mass % of the total mass of a monolayer(s). In a preferred embodiment, the amount of matrix material in a monolayer ranges from 4 to 17 weight %. More preferably the amount of matrix material in a monolayer ranges from 5 to 15 weight %.

The amount of matrix materials of the face layers may be 0 mass %, but is preferably at least 1 mass % of the total mass of the monolayer(s). More preferably the matrix materials of the face layers is at least 3 mass % of the total mass of the monolayer(s), most preferably the matrix materials of the face layers is at least 5 mass % of the total mass of the monolayer(s).

The matrix material employed in at least one of the first monolayers of the core may be a elastomeric matrix material which matrix material will typically have a tensile modulus (i.e. secant modulus measured at about 23° C. according to ISO 527 at a strain of 100%) of less than about 3 MPa, sometimes less than about 2.5 MPa, for example less than about 2.0 MPa. This would lead to a further improved ballistic resistant sheet. According to some embodiments, the elastomeric matrix material may have a tensile modulus of less than about 1.5 MPa. Alternative embodiments relate to a ballistic resistant sheet, whereby at least one of the face layers, 12-2 and/or 12-3, may also comprise an elastomeric matrix material.

The elastomeric matrix may be comprised of at least one material selected from the group consisting of polybutadiene, polyisoprene, natural rubber, ethylene-propylene copolymers, ethylene-propylene-diene terpolymers, polysulfide polymers, polyurethane, polyurethane elastomers, modified polyolefins, chlorosulfonated polyethylene, polychloroprene, plasticized polyvinylchloride, butadiene acrylonitrile elastomers, poly(isobutylene-co-isoprene), polyacrylates, polyesters, polyethers, fluoroelastomers, silicone elastomers, thermoplastic elastomers, and ethylene copolymers. According to some embodiments, the elastomeric matrix material may comprise a block copolymer of a conjugated diene and a vinyl aromatic monomer. In this regard, the conjugated diene may be butadiene or isoprene while the vinyl aromatic monomer may be styrene, vinyl toluene or t-butyl styrene.

In alternative embodiments, the matrix material employed in at least one of the second or third monolayers of the face layers will typically have a tensile modulus that is higher than the tensile modulus of the matrix material employed in the core layer. Preferably this tensile modulus (i.e. secant modulus measured at about 23° C. according to ISO 527 at a strain of 100%) is at least 3 MPa or greater, for example a tensile modulus of at least about 5 MPa or greater, e.g., up to about 500 MPa. This matrix material may be at least one selected from the group consisting of acrylates, polyurethanes, polyolefins—preferably polyethylene, modified polyolefins and ethylene vinyl acetate. Preferably, this matrix material contains a polyurethane. More preferably, the polyurethane is a polyetherurethane that is based on a polyetherdiol. Such a polyurethane provides good performance over a wide temperature range. In some embodiments, the polyurethane or polyetherurethane is based on aliphatic diisocyanates as this further improves product performance.

Particularly suitable are those matrix materials that can be applied as a dispersion in water. Examples of suitable thermoplastic materials that may be employed as the matrix material include (poly)acrylates, polyurethanes, polyolefins—preferably polyethylene, modified polyolefins and (poly)ethylene vinyl acetate.

In an alternative embodiment, the ballistic resistant sheets may be consolidated under an elevated pressure of at least about 16.5 MPa and an elevated temperature of preferably at least 10° C. below a temperature at which the fiber melts or at which mechanical properties of the first, second and third UD fibers deteriorate. Some embodiments will consolidate the sheets at an elevated pressure of at least about 20 MPa, for example at least about 25 MPa. The elevated pressure employed for sheet consolidation may be between about 16.5 MPa up to at least about 350 MPa, for example between 16.5 MPa to about 90 MPa, e.g., about 45 MPa.

In the present invention the percentage of face layers and core layer in ballistic resistant sheet may be chosen upon desire as long as three layers remain present. Generally a face layer is present in an amount of at least 5 mass % (of the total mass of the ballistic resistant sheet). Typically a face layers constitutes less than 45 mass % of the ballistic resistant sheet. Preferably a face layer is present in an amount of between 10 and 40 mass %. If in such a case the other face layer is present in the same amount, the core layer may be present in an amount of between 80 and 20 mass %. In a further preferred range a face layer is present in an amount of between 20 and 30 mass %.

The numerical Flexibility Value of the core and or face layers may be determined by the type of fibers including their strength and stiffness, the type of matrix material, the build-up of the monolayer and optional layers in intimate contact with or joined to a monolayer. The numerical Flexibility Value hence is influenced by various parameters. In the event that the ballistic resistant sheet of the invention would comprise sub-sheets, the build-up of a sub-sheet would also influence its flexibility. It will be understood that the skilled person can optimize the concept of the invention further by some routine experiments based on the above guidance within the composition of the ballistic resistant sheet according to the invention.

In a preferred embodiment the layers 12-1, 12-2 and 12-3 are preferably directly bonded to one another. In one of such embodiments, there are preferably no additional material layers between layer 12-1 and the layers 12-2, and/or 12-3.

However, if desired one or more intermediate layers may be included in the ballistic resistant sheet of the invention, e.g. between the layer 12-1 and the layers 12-2 or 12-3, in order to enhance bonding therebetween and/or to provide desired performance benefits. Such layer would improve multi-hit performance, or alternatively back face deformation. Thus, for example, an adhesive layer may be provided if desired between the layer 12-1 and each of the layers 12-2. Adhesive layers are well known in the art and may comprise e.g. a scrim or film layer. Such adhesive layers may suitably be made of various materials including polyolefins and modified polyolefins, and specifically polyethylenes and modified polyethylene.

Figure 4:
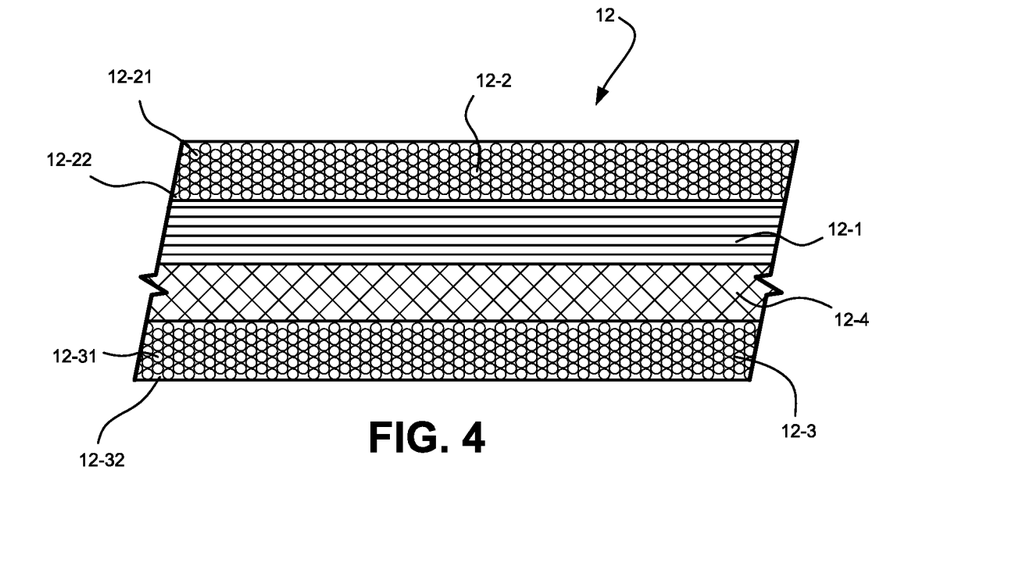
FIG. 4 is a schematic cross-sectional view of an embodiment of the hybrid ballistic resistant sheet similar to FIG. 2 having a trauma liner 12-4 between the core layer 12-1 and the face layer 12-3.

In an alternative embodiment such intermediate layer positioned between the layers 12-1 and 12-3 may be a trauma reducing layer (12-4) as schematically depicted in FIG. 4. Such a layer may be selected from the group consisting of a nonwoven network of randomly oriented reinforcing fibers, an open knitted network of reinforcing fibers, a woven structure of reinforcing fibers, and/or a polymeric film and/or a polymeric foam. The reinforcing fibers typically have a tensile strength (ASTM D885M) of at least 1.5 GPa. More preferably the trauma reducing layer comprises a nonwoven network of randomly oriented reinforcing fibers, a polymeric film or a polymeric foam. A first preferred embodiment of the trauma reducing layer comprises nonwoven networks of randomly oriented reinforcing fibers, more preferably nonwoven networks of randomly oriented discontinuous reinforcing fibers, even more preferably a felt, and most preferably a needle punched felt.

Preferred nonwoven networks of randomly oriented discontinuous reinforcing fibers have fiber lengths ranging from about 0.50 to 50 cm, more preferably from about 2.50 to 25 cm, and most preferably from about 5 to 15 cm. As fiber length increases the anti-ballistic performance generally also improves. Nonwoven networks of randomly oriented discontinuous reinforcing fibers are known per se and may be prepared by carding for instance or by air or liquid laying. Consolidating or bonding the network of reinforcing fibers for handling may be carried out mechanically, for instance by needle punching, chemically, for instance with an adhesive, and/or thermally by forming point bonds or intermingling with reinforcing fibers with a lower melting point. Preferred nonwoven networks of randomly oriented discontinuous reinforcing fibers are consolidated by needle punching, alone or followed by one of the other methods. A further preferred embodiment of the trauma reducing layer comprises a polymeric film and/or a polymeric foam. Suitable (thermoplastic) polymers include polyamides, polyimides, polyethersulphones, polyetheretherketone, polyurethane, polyolefines, such as polyethylene and polypropylene, polyphenylene sulphides, polyamide-imides, acrylonitrile butadiene styrene (ABS), styrene/maleic anhydride (SMA), polycarbonate, polyphenylene oxide blend (PPO), thermoplastic polyesters such as polyethylene terephthalate, polybutylene terephthalate, as well as mixtures and copolymers of one or more of the above polymers. A polymeric foam, especially a polyethylene foam is particularly preferred. Polycarbonate is a particularly preferred polymeric film. Thermosetting polymers may also be used. Suitable examples include epoxies, unsaturated polyester resins, melamine/formaldehyde resins, phenol/formaldehyde resins, polyurethane resins, and the like.

A further preferred embodiment of the trauma reducing layer (1'2-4) comprises a woven network of the mentioned reinforcing fibers. Such woven network may be coated or impregnated, e.g. with a polymeric material—e.g. the same composition as the earlier mentioned matrix material-, of may be laminated with a polymeric film. A known example of a trauma reducing layer is coated woven aramid fabric. Suitable areal densities of the trauma reducing layers in the form of a polymeric film and/or foam may be selected within broad ranges. Preferred areal densities range from 10 to 500 $g/m^2$, more preferably from 50 to 400 $g/m^2$, and most preferably from 100 and 350 $g/m^2$. Preferred areal densities of the trauma reducing layers in the form of a nonwoven network of randomly oriented fibers range from 20 to 500 $g/m^2$, more preferably from 80 to 400 $g/m^2$, even more preferably from 100 to 300 $g/m^2$, and most preferably from 150 to 250 $g/m^2$. Preferred areal densities of the fibrous layers range from 50 to 500 $g/m^2$, more preferably from 80 to 250 $g/m^2$, and most preferably from 100 to 200 $g/m^2$.

In one preferred embodiment, both strike face 12-2 and back face layers 12-3 are identical in construction, type/chemical composition of fiber and matrix material and amount. One such embodiment could relate to e.g. a full polyethylene fiber based ballistic resistant sheet, including its face and core layers. In another preferred embodiment, both strike face 12-2 and back face layers 12-3 differ—within the boundaries given for the invention—in construction, type of fiber and matrix material and amount.

A preferred embodiment of the present invention relates to a ballistic resistant sheet in the form of a three-layer hybrid structure, consisting of a core layer and face layers joined to respective opposing surfaces of the core layer, wherein the core layer comprises at least two first monolayers comprised of first unidirectionally (UD) oriented fibers and an elastomeric matrix material, and wherein each of the face layers comprise at least two second monolayers comprised of second UD oriented fibers and at least two third monolayers comprised of third UD oriented fibers respectively, and optionally a non-elastomeric matrix material.

In a preferred embodiment the weight of the strike face is at least 1.1 times the amount of the back face. More preferably the weight of the strike face is at least 1.5 times the amount of the back face. Generally the weight of the strike face is less than 5 times the amount of the back face.

A further preferred embodiment of the present invention relates to a ballistic resistant sheet comprising a core layer and face layers joined to respective opposing surfaces of the core layer, wherein the core layer comprises at least two first monolayers comprised of first unidirectionally (UD) oriented fibers and an elastomeric matrix material, and wherein one of the face layers comprise at least two second monolayers comprised of second UD oriented fibers and an optional non-elastomeric matrix material, wherein another of the face layers comprise at least one third monolayer comprised of third UD oriented fibers and an optional non-elastomeric matrix material.

In a preferred embodiment of the invention, the fibers in the core or face layers may be replaced by tapes. In another preferred embodiment, the fibers in at least one face layer may be in the shape of a tape. In yet another preferred embodiment the fibers in the strike face layer may be replaced by tapes.

In yet another preferred embodiment of the present invention, the tapes in at least both face layers are arranged in a woven fashion optionally with matrix material, and whereby the core layer comprises at least two first monolayers comprised of first unidirectionally (UD) oriented fibers and an elastomeric matrix material.

A tape is an elongated object with its length being a multitude of its width or thickness. Typically the thickness of a tape is at least 10 micrometer, preferably at least 20 micrometer. The thickness of a tape is generally less than 200 micrometers, preferably less than 150 micrometers, even more preferably less than 100 micrometers. Width of such a tape is preferably at least 1 mm, preferably at least 5 mm, more preferably at least 15 mm, even more preferably at least 25 mm and most preferably at least 50 mm. In principle there are no limitations to the maximum width of the tape. Generally the width will be chosen less than 2000 mm, preferably less than 1500 mm, even more preferably less than 1000 mm, preferably less than 500 mm, and most preferably less than 250 mm. The tensile strength of the tape is preferably at least 1.5 GPa, more preferably at least 2.0 GPa and most preferably at least 2.5 GPa. Tensile strength is measured at 25° C. on tapes of a width of 20 mm as specified in ASTM D882, using a nominal gauge length of the tape of 440 mm, a crosshead speed of 50 mm/min. The tape is preferably based on a polyolefin polymer or copolymer, such as polypropylene or polyethylene. A preferred type of polyethylene is the earlier described UHMWPE.

The embodiments described herein will be further understood from the following non-limiting examples thereof.
Test Methods:
Flexibility Value Test:

For this test monolayers or sub-sheets to be tested were stacked such that a stack with a mass of between 3.6 and 3.7 kg/m$^2$ was obtained. The layers or sheets to be tested had dimensions of 100*200 mm.

The stack was positioned in its longest direction on a bending test rig, with 2 trailers with a radius of 5 mm, whereby the trailers were positioned at a distance of 60 mm between them. The width of the trailers is 60 mm. On top of the stack a bending thorn (width of 60 mm; radius of 10 mm) was positioned in the middle between the 2 trailers. The bending thorn was moved down (at a speed of 10 mm/min) and the force on the thorn after 25 mm deflection of the stack was reported. This Flexibility Value test therefore can be seen as a '3-point bending test' of a stack of monolayers or sub-sheets.

The reported numerical Flexibility Value is the average of 5 measurements. The sample is tested at 21° C. and 65+/−2% relative humidity.

For the results obtained from this Flexibility Value test, a lower numerical Flexibility Value that is obtained for such Flexibility Value test means a better flexibility. A higher numerical Flexibility Value that is obtained for such Flexibility Value test is thus representative of an increased stiffness of the tested stack.
Ballistic Testing The ballistic resistant sheets according to the invention were tested according to NIJ010104. For that purpose the sheets were placed onto a testing fixture with Roma Plastilina® clay. Prior to the ballistic test, the Roma Plastilina® clay was conditioned at a heated chamber and calibrated before mounting onto the testing fixture.

The ballistic resistant sheets according to the invention was shot 6 times against 0.44 Magnum SJHP SPEER to determine the 'V0'. Each of shots had a velocity ranging between 436±9 m/s. In the event that all 6 shots were stopped, this is reported below as STOP After the ballistic tests the backface deformation or signature (BFD) was determined by measuring the depression produced at the clay backing material.

EXAMPLE AND COMPARATIVE EXPERIMENTS

Sub-Sheets

A sub-sheet A was made by stacking and adhering 4 monolayers with UHMWPE fibers with a strength of about 3.2 GPa and 19 wt % of a Kraton® SEBS matrix whereby the fiber direction of adjacent monolayers was rotated 90 degrees, and with a 7 micrometer polyethylene separating film at both outer faces of the sub-sheet. The areal density of a sheet A was 145 g/m$^2$.

The numerical Flexibility Value of sub-sheet A was 4.7 N/kg/m$^2$.

A sub-sheet B was made by stacking and adhering 4 monolayers with UHMWPE fibers with a strength of about 3.2 GPa and 17 wt % of a Kraton® SEBS matrix whereby the fiber direction of adjacent monolayers was rotated 90 degrees, and with a 7 micrometer polyethylene film at both outer faces of the sub-sheet. The areal density of a sheet B was 253 g/m$^2$.

The numerical Flexibility Value of sub-sheet B was 9.8 N/kg/m².

A sub-sheet C was made by stacking and adhering 6 monolayers with UHMWPE fibers with a strength of about 3.8 GPa and 17 wt % of a Kraton® SEBS matrix whereby the fiber direction of adjacent monolayers was rotated 90 degrees, and with a 7 micrometer polyethylene film at both outer faces of the sub-sheet. The areal density of a sheet C was about 215 g/m².

The numerical Flexibility Value of sub-sheet C was 8.9 N/kg/m².

A trauma reducing layer T, consisting of Twaron® AT Flex, consisting of a coated fabric of woven aramid fiber, was used in the trials.

Comparative Experiment CA

A ballistic resistant sheet (40*40 cm²) with core (12-1) and face layers (12-2, 12-3) was made by stacking:
9 sub-sheets C (forming the strike face 12-2), and
12 sub-sheets A (forming the core layer 12-1), and
2 sub-sheets A (forming the back face 12-3).

Additionally 1 layer T is positioned in between core layer 12-1 and face layer 12-3. The areal density of the ballistic resistant sheet was 4.4 kg/m².

Consequently strike face/core layer/back face of the ballistic resistant sheet comprised sheets C/A/A.

Comparative Experiment CB

A ballistic resistant sheet (40*40 cm²) with core (12-1) and face layers (12-2, 12-3) was made by stacking:
8 sub-sheets C (forming the strike face 12-2), and
7 sub-sheets B (forming the core layer 12-1), and
2 sub-sheets C (forming the back face 12-3).

Additionally 1 layer T is positioned in between core layer 12-1 and face layer 12-3. The areal density of the ballistic resistant sheet was 4.4 kg/m².

Consequently strike face/core layer/back face of the ballistic resistant sheet comprised sheets C/B/C.

Example 1

A ballistic resistant sheet (40*40 cm²) with core (12-1) and face layers (12-2, 12-3) was made by stacking:
6 sub-sheets C (forming the strike face 12-2), and
13 sub-sheets A (forming the core layer 12-1), and
3 sub-sheets C (forming the back face 12-3).

Additionally 1 layer T is positioned in between core layer 12-1 and face layer 12-3. The areal density of the ballistic resistant sheet was 4.3 kg/m².

Consequently strike face/core layer/back face of the ballistic resistant sheet comprised sheets C/A/C.

The results of this testing is shown in Table 1 below:

TABLE 1

| Test | Construction* (strike face/core layer/back face) | BFD [mm] | V0 |
|---|---|---|---|
| CA | C/A/A | 46 | STOP |
| CB | C/B/C | 48 | STOP |
| 1 | C/A/C | 39 | STOP |

*additionally, all samples had 1 layer T between core layer and back face

The test data from table 1 show that all bullets were stopped.

The test data furthermore show that the ballistic resistant sheet according to the invention (Example 1) had a significantly lower back face deformation than the sample of Comparative Experiment B. This is surprising since the core layer of the product according to the invention in Example 1 was more flexible, yet the ballistic resistant sheet resulted in less back face deformation.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope thereof.

The invention claimed is:

1. A drapable ballistic resistant sheet comprising; a three-layer hybrid structure which comprises an unconsolidated stack of sub-sheets which establish a core layer, a strike face layer and a back face layer, wherein the core layer comprises at least one consolidated first monolayer comprised of first unidirectionally (UD) oriented fibers and a matrix material, and wherein the strike face layer comprises at least one consolidated second monolayer comprised of second UD oriented fibers and a matrix material, and wherein the back face layer comprises at least one consolidated third monolayer comprised of third UD oriented fibers and a matrix material, and wherein each of the strike face layer and the back face layer has a numerical Flexibility Value that is higher than a numerical Flexibility Value of the core layer, wherein the higher numerical Flexibility Value represents increased stiffness.

2. The ballistic resistant sheet according to claim 1, wherein at least one of the first, second and third UD fibers is formed of organic fibers selected from the group consisting of aromatic polyamide fibers, liquid crystalline polymer fibers, and ladder-like polymer fibers, polyolefin fibers, polyvinyl alcohol fibers, and polyacrylonitriles fibers.

3. The ballistic resistant sheet according to claim 2, wherein at least one of the first, second and third UD fibers is formed of ultra high molecular weight (UHMW) polyethylene fibers, polybenzimidazole fibers, poly(1,4-phenylene-2,6-benzobisoxazole fibers and poly(2,6-diimidazo[4,5-b-4',5'-e]pyridinylene-1,4-(2,5-dihydroxy)phenylene) fibers.

4. The ballistic resistant sheet according to claim 1, wherein the matrix materials of the core layer, the strike face layer and the back face layer are present in an amount of at most 20 mass % of the total mass of the respective core layer, strike face layer and back face layer.

5. The ballistic resistant sheet according to claim 1, wherein the matrix material is comprised of at least one selected from the group consisting of polybutadiene, polyisoprene, natural rubber, ethylene-propylene copolymers, ethylene-propylene-diene terpolymers, polysulfide polymers, polyurethane, polyurethane elastomers, modified polyolefins, chlorosulfonated polyethylene, polychloroprene, plasticized polyvinylchloride, butadiene acrylonitrile elastomers, poly(isobutylene-co-isoprene), polyacrylates, polyesters, polyethers, fluoroelastomers, silicone elastomers, thermoplastic elastomers, plastomers, and ethylene copolymers.

6. The ballistic resistant sheet according to claim 1, wherein the matrix material in the core layer has a tensile modulus of less than 3 MPa.

7. The ballistic resistant sheet according to claim 1 wherein the core layer is present in an amount of 10 to 70 weight % of the total mass of the ballistic resistant article.

8. The ballistic resistant sheet according to claim 1 wherein a weight ratio of the weight of the strike face layer is at least 1.1 times the weight of the back face layer.

9. The ballistic resistant sheet according to claim 1, wherein at least one polymer film is attached to at least one sub-sheet of the core layer and/or at least one of the strike face layer and the back face layer.

10. The ballistic resistant sheet according to claim 1 wherein the UD-oriented fibers in the strike face and back face layers have a tensile strength of at least 2.0 GPa.

11. The ballistic resistant sheet according to claim 1, wherein the UD-oriented fibers in the monolayers are formed of ultra high molecular weight polyethylene (UHMWPE).

12. The ballistic resistant sheet according to claim 11, wherein the UHMWPE has an intrinsic viscosity of at least 6 dl/g.

13. The ballistic resistant sheet according to claim 1 wherein the UD-oriented fibers in the strike face and back face layers have a tensile strength that is at least 1.05 times higher than the tensile strength of the UD-oriented fibers in the core layer.

14. The ballistic resistant sheet according to claim 1, further comprising a trauma liner.

15. A soft ballistic article which comprises the ballistic resistant sheet according to claim 1.

* * * * *